United States Patent Office 3,291,865
Patented Dec. 13, 1966

3,291,865
CYCLIC POLYMERIC PHOSPHONITRILATE COMPOSITIONS
Ehrenfried H. Kober, Hamden, Henry F. Lederle, North Haven, and Gerhard F. Ottmann, Hamden, Conn., assignors to Olin Mathieson Chemical Corporation
No Drawing. Filed Mar. 30, 1964, Ser. No. 355,938
25 Claims. (Cl. 260—927)

This invention relates to novel phosphonitrilates, their preparation and their use as non-flammable, hydrolytically stable hydraulic fluids, lubricants, and additives.

This application is a continuation-in-part of our application Serial No. 307,031 filed September 6, 1963 entitled "Composition and Process," which is now abandoned.

Polyfluoroalkyl-substituted phosphonitrilates have been available previously for use as hydraulic fluids, lubricants, and the like. Less favorable properties of some of the polyfluoroalkyl-substituted phosphonitrilates include their high pour point, low boiling point and thus high volatility and relatively narrow liquid range, high density, and relatively low spontaneous ignition temperature.

Organic phosphonitrilates which are substituted only with aryl groups have relatively high melting points and thus are not suitable for use as lubricants and hydraulic fluids.

It is a primary object of this invention to provide novel organic phosphonitrilates.

Another object of this invention is to provide improved hydraulic fluids.

Still another object of this invention is to provide improved lubricating fluids.

A further object is to provide an additive for known lubricants to improve the lubricity thereof.

It is another object of this invention to provide novel non-flammable liquid organic phosphonitrilates.

A further object of this invention is to provide a method of preparing aryloxy-polyfluoroalkoxy-substituted phosphonitriles.

These and other objects of this invention will be apparent from the following detailed description thereof.

It has now been discovered that the above mentioned objects are accomplished by reacting a polymeric cyclic phosphonitrilic halide with a phenolic compound and a polyfluoro alcohol in the presence of an alkaline compound to effect substantially complete substitution of the halid atoms by the aryloxy and polyfluoroalkoxy moieties, and recovering the resulting aryloxy-polyfluoroalkoxy-substituted phosphonitriles.

The cyclic polymeric phosphonitrilic halides suitable for use as a reactant in this invention are represented by the formula:

(I) $[-N=P(X)_2-]_n$ where X is a halide such as chlorine, fluorine, or bromine, and preferably chlorine or fluorine, and $n$ is a whole number of at least three and up to about seven or higher. The cyclic structure is formed by alternating P and N atoms. Preferably the trimeric or tetrameric phosphonitrilic halides are employed. The trimeric and tetrameric forms of phosphonitrilic halides are represented by the following cyclic structures:

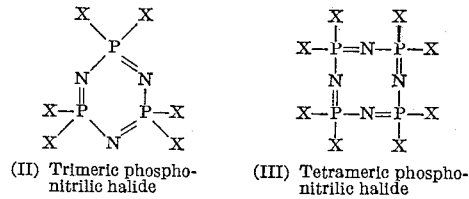

(II) Trimeric phosphonitrilic halide (III) Tetrameric phosphonitrilic halide

In Formulae II and III, X has the meaning defined above.

Any phenolic compound capable of substituting at least one halide of a cyclic phosphonitrilic halide under the reaction conditions employed in this invention may be utilized as a reactant. Phenolic compounds suitable for use as a reactant in the process of this invention include:

(A) Monohydroxyphenols such as:

Phenol
Isomeric forms of naphthol (B) Isomeric forms of phenoxyphenols
(C) Alkoxy-substituted phenols such as the various isomeric forms of:

Mono-, di-, or trimethoxyphenols
Mono-, di-, or triethoxyphenols
Mono-, di-, or tripropoxyphenols
Mono-, di-, or tributoxyphenols
Mono-, di-, or tripentoxyphenols
Dimethyl-butoxyphenols
Dimethyl-pentoxyphenols
Dimethyl-hexoxyphenols (D) Alkyl-substituted phenols such as the various isomeric forms of:

Methylphenols
Ethylphenols
Dibutylphenols
Tertiary butylphenols
Octylphenols
Dimethylphenols
Dioctylphenols (E) Aryl-substituted phenols such as the various isomeric forms of:

Phenylphenols
Methylphenylphenols
Propylphenylphenols
Octylphenylphenols (F) Halogen-substituted phenols such as the various isomeric forms of:

Mono-, di-, tri-, tetra-, or pentachlorophenols
Mono-, di-, tri-, tetra-, or pentabromophenols
Mono-, di-, tri-, tetra-, or pentafluorophenols (G) Halogenated-alkyl-substituted phenols such as the various isomeric forms of:

Mono-, di-, or trichloromethylphenols
Mono-, di-, or tribromomethylphenols
Mono-, di-, or trifluoromethylphenols
Bis(mono, di-, or trichloromethyl)phenols
Bis(mono-, di-, or tribromomethyl)phenols
Bis(mono-, di-, or trifluoromethyl)phenols (H) Halogenated-alkoxy-substituted phenols such as the various isomeric forms of:

Mono-, di-, or trichloromethoxyphenols
Mono-, di-, or trifluoromethoxyphenols
Trifluoroethoxyphenols
Octafluoropentoxyphenols
Bis(mono-, di-, or trifluoromethoxy)phenols (I) Mixtures thereof and the like.

Alkyls employed as substituents in the phenolic compounds of the type mentioned above generally have between 1 and about 12 carbon atoms and preferably between about 1 and about 10 carbon atoms in the alkyl substituents. However, larger numbers of carbon atoms in the alkyl substituents may be employed if desired.

Polyfluoro alcohols suitable for use in the instant invention have the following formula:

(IV) $\quad Z(CF_2)_yCH_2OH$ where $y$ is a number from 1 to 20, and preferably from 1 to 8, and Z is hydrogen or fluorine. Typical examples of suitable polyfluoro alcohols include 1,1,3-tri-H-tetrafluoropropyl alcohol, 1,1,5-tri-H-octafluoropentyl alcohol, 1,1,7-tri-H-dodecafluoroheptyl alcohol, 1,1-di-H-trifluoroethyl alcohol, 1,1-di-H-heptafluorobutyl alcohol, 1,1,-di-H-pentadecafluorooctyl alcohol, etc., as well as mixtures thereof, and the like.

The alkaline compound employed in the reaction can be any alkaline compound capable of acting as an acceptor for the hydrogen halide produced in the reaction. However, an alkali metal hydroxide such as potassium hydroxide or sodium hydroxide is preferably employed for this purpose, but alkaline earth metal hydroxides such as calcium hydroxide, and the like may also be employed. Sodium hydride might also be employed when reacting the fluorinated alcohols with the phosphonitrilic chlorides, especially when low boiling fluorinated alcohols such as trifluoroethanol or heptafluorobutanol are used. In these cases, the sodium salt of the fluorinated alcohol is formed first. In the second step, the sodium salt of the fluorinated alcohol, the phenolic compound and the alkaline hydroxide are then reacted with the phosphonitrilic halide to effect complete substitution of all halide atoms attached to the phosphonitrilic moiety by fluoroalkoxy and aryloxy groups. Hydrogen chloride acceptors such as sodium hydride or triethylamine cannot be utilized in the second step, since complete substitution of all halide atoms attached to the phosphonitrilic moiety is not easily achieved. Residual unsubstituted chloride gives rise to hydrolytic instability.

Sufficient alkaline compound is employed to provide at least the stoichiometric proportion to form the corresponding alkaline halide with all of the halide atoms attached to the phosphonitrilic moiety, and preferably between about 1.2 and about 1.5 times the stoichiometric proportion.

The reaction may be carried out in an inert solvent capable of dissolving the phosphonitrilic halide. Suitable solvents include benzene, toluene, xylene, chlorobenzene, mixtures thereof and the like.

The total number of moles of phenolic compound and polyfluoro alcohol employed per monomeric unit $$[-N=P(X)_2-]$$

in the phosphonitrilic halide is equivalent to a molar ratio of between about 2:1 and about 4:1, and preferably between about 2:1 and about 2.5:1. If a molar ratio of less than about 2:1 is employed complete substitution of the halide atoms of the phosphonitrilic halide is not effected. Molar ratios of greater than about 4:1 may be employed, but no significant improvement in yield is effected by the use of amounts of the phenolic compound and/or polyfluoro alcohol in excess of this ratio.

The amount of the phenolic compound employed as a reactant in the process of this invention is equivalent to at least 1 mole of the phenolic compound per mole of cyclic phosphonitrilic halide employed. In addition, the amount of polyfluoro alcohol employed as a reactant is equivalent to at least 1 mole of the alcohol per mole of cyclic phosphonitrilic halide. Thus, when stoichiometric proportions are employed, for each mole of tetrameric phosphonitrilic halide reacted, there is reacted between 1 mole and 7 moles of the phenolic compound, and between 7 moles and 1 mole of the polyfluoro alcohol, the total moles of phenolic compound and alcohol being 8 moles.

In carrying out the process of this invention, the phosphonitrilic halide may be added to a solution of the phenolic compound and the alkaline compound in a suitable solvent of the type described above. Water formed as a product of the reaction is removed azeotropically, and the polyfluoro alcohol and additional alkaline compound are added to substitute the remaining unreacted halide atoms on the phosphonitrilic halide ring.

The order of addition of the reactants is not critical with respect to the completeness of the substitution. Thus, either the phenolic compound or the polyfluoro alcohol may be first reacted with the phosphonitrilic halide, or both of the compounds may be reacted simultaneously with the halide to effect complete substitution. However, the order of addition does affect the composition and physical properties of the final product and the degree of aryloxy- and polyfluoroalkoxy-substitution.

The reaction is performed at temperatures in the range between about 75° and about 180° C., and preferably in the range between about 100° and about 150° C.

The reaction time will vary with the reactants employed and the temperature employed, but complete reaction can generally be obtained in between about 2 and about 72 hours.

Pressure conditions during the reaction are not critical. Generally, atmospheric pressure is employed, but higher or lower pressures may be employed if desired.

The reaction of the cyclic phosphonitrilic halide with both the phenolic compound and polyfluoro alcohol is represented by the following formula:

(V) $\quad N_nP_nX_{2n} + aR'H + bR''H \rightarrow N_nP_nR'_aR''_b + 2nHX$ where $n$ is a whole number between 3 and 7, where $a+b=2n$, where $a$ has the value of between 1 and $(2n-1)$, where $b$ has the value of between 1 and $(2n-1)$, where X is a halide such as chlorine, fluorine or bromine, where R' is a polyfluoroalkoxy group of the generic formula $Z(CH_2)yCH_2O-$ in which $y$ is a whole number from 1 to 20 and preferably 1 to 8, and Z is hydrogen or fluorine, and where R'' is an aryloxy group selected from the group consisting of phenoxy, naphthoxy, aryloxy-substituted phenoxy, alkoxy-substituted phenoxy, alkyl-substituted phenoxy, aryl-substituted phenoxy, halogen-substituted phenoxy, halogenated alkyl-substituted phenoxy, halogenated-alkoxy-substituted phenoxy, and mixtures thereof. Typical examples of suitable aryloxy groups are those derived from the previously illustrated phenolic compound reactant.

Thus, to illustrate the product obtained when cyclic trimeric phosphonitrilic halide of Formula II is reacted with 4 moles of a polyfluoro alcohol (R'H) and 2 moles of a phenolic compound (R''H), the novel product is represented by the following formula:

(VI) 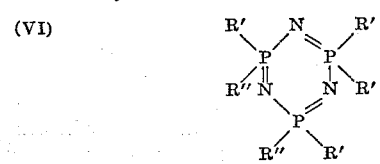

and/or isomers thereof.

The compounds of this invention are fire-resistant, have low pour points, high boiling points and thus low volatilities and relatively wide liquid range. Their density is relatively low which makes them suitable for present engine designs. Their spontaneous ignition temperature is very high, and they are characterized by excellent hydrolytic stability and possess outstanding lubricity characteristics. In addition, when added to conventional lubricants, such as tricresyl phosphate, mineral oil, etc., they improve the lubricity thereof.

The following examples are presented to further illustrate the invention without any intention of being limited thereby. All parts and percentages are by weight unless otherwise specified.

The following abbreviations have been used throughout the examples:

(1) B.P.=boiling point.
(2) K.Vis.$_{100}$=kinematic viscosity in centistokes at 100° F.
(3) K.Vis.$_{210}$=kinematic viscosity in centistokes at 210° F.
(4) ASTM slope=slope obtained in accordance with ASTM designation number D341-43, "Standard viscosity-temperature charts for liquid petroleum products."
(5) mm.=millimeters of mercury.
(6) density=grams/cc. at 25° C.

Nuclear magnetic resonance was used to determine in each example the ratio of fluoroalkoxy to aryloxy moieties in the products, and was supplemented by Kjeldahl nitrogen analysis. The potassium hydroxide, when employed in the examples, was considered to be 90 percent pure. Thus, the weight presented for potassium hydroxide is the weight of the reagent employed, but the moles recited are the moles of pure KOH present in the reagent.

All spontaneous ignition temperatures were obtained by dropping a few drops of the product into a porcelain crucible heated by means of an electric furnace, the ignition temperature being obtained by means of a thermocouple.

Example 1

A five liter three neck flask equipped with stirrer, Dean-Stark distilling trap, and condenser was charged with 2000 ml. of xylene, 188 g. (2.0 moles) of phenol, 696 g. (3.0 moles) of $H(CF_2)_4CH_2OH$, 232 g. (0.667 mole) of phosphonitrilic chloride trimer, and 312 g. (5.00 moles) of potassium hydroxide. The reaction was initiated by a short heating period. At 50° to 60° C., the reaction became very vigorous and was controlled by immersing in an ice bath. After the vigorous reaction had subsided the reaction mixture was refluxed for sixteen hours after formation of water had ceased. After cooling to room temperature the mixture was extracted with two liters of 5 percent aqueous potassium hydroxide to remove excessive phenol and to dissolve the potassium chloride formed. Then, the xylene solution was washed with two liters of aqueous sodium sulfate solution. The solvent was removed by distillation first at 170° C. under atmospheric pressure, then at 190° C. under water aspirator pressure, and finally at 160° C. under oil pump pressure for several hours. After filtration, a nearly quantitative yield of crude reaction product was obtained.

The product was then distilled through a 12 inch Vigreaux column yielding the following fractions:

(1) B.P.=106–212° C./0.5 mm.; $n_D^{25}$=1.3874; 15.0 percent of the total distillate.
(2) B.P.=212–240° C./0.5 mm.; $n_D^{25}$=1.3974; 62.7 percent of the total distillate.
(3) B.P.=235–243° C./0.6 mm.; $n_D^{25}$=1.4300; 20.7 percent of the total distillate.
(4) B.P.=234–235° C./1.3 mm.; $n_D^{25}$=1.4370; 1.6 percent of the total distillate.
(5) Bottoms=22.6 percent of total overhead product.

The combined fractions 2, 3 and 4 had a refractive index of 1.4043. Based on data obtained by nuclear magnetic resonance spectroscopy, this product contained 1.94 moles of phenoxy groups, the remaining 4.06 moles being the fluoroalkoxy groups. The average composition of the product corresponds approximately to the structure shown in Formula VI and/or to isomers thereof. Physical properties of the product: K.Vis.$_{100}$=146.1 cs.; K.Vis.$_{210}$=11.2 cs.; ASTM slope=0.772; density=1.63; pour point=−15° F.; and spontaneous ignition temperature =1175° F.

Example 2

A five liter three neck flask fitted with stirrer, Dean-Stark distilling trap, and condenser was charged with 2000 ml. of toluene, 235 g. (2.5 moles) of phenol, 232 g. (0.667 mole) of phosphonitrilic chloride trimer, and 165 g. (2.64 moles) of potassium hydroxide. The mixture was heated cautiously to reflux. When no more water separated in the trap, the mixture was permitted to cool, and 500 ml. of toluene, 580 g. (2.5 moles) of $H(CF_2)_4CH_2OH$, and 165 g. (2.94 moles) of potassium hydroxide were added. Refluxing was then resumed and continued for sixteen hours after no more water was collected. The reaction product was separated as described in Example 1. The crude yield was 86 percent of the theoretical amount. Distillation afforded the following fractions:

(1) B.P.=125–245° C./0.8 mm.; $n_D^{25}$=1.3951; 11.6 percent of the total distillate.
(2) B.P.=242–259° C./0.7 mm.; $n_D^{25}$=1.4490; 58.6 percent of the total distillate.
(3) B.P.=259–260° C./0.9 mm.; $n_D^{25}$=1.4698; 29.0 percent of the total distillate.
(4) BP.=260–261° C./1.3 mm.; $n_D^{25}$=1.4774; 0.8 percent of the total distillate.
(5) Bottoms=26.0 percent of the total distillate.

The combined fractions 2, 3 and 4 had a refractive index of 1.4550. This product contained 3.45 moles of phenoxy groups, the remaining 2.55 moles being the fluoroalkoxy groups. Physical properties were as follows: K.Vis.$_{100}$=172.1 cs.; K.Vis.$_{210}$=11.6 cs.; ASTM slope=0.79; density=1.54; pour point=5° F.

Example 3

Amounts of 248 g. (1.876 moles) of $H(CF_2)_2CH_2OH$, 176 g. (1.876 moles) of phenol, 233.5 g. (3.81 moles) of potassium hydroxide, 172.8 g. (0.5 mole) of phosphonitrilic chloride trimer, and 1000 ml. of toluene were reacted as described in Example 1.

The product (86 percent crude yield) was distilled in vacuo affording the following fractions:

(1) B.P.=118–196° C./0.40–0.38 mm.; $n_D^{25}$=1.4181; 5.7 percent of the overhead.
(2) B.P.=196–238° C./0.40 mm.; $n_D^{25}$=1.4472; 54.6 percent of the overhead.
(3) B.P.=238–260° C./0.40–0.46 mm.; $n_D^{25}$=1.4946; 36.8 percent of the overhead.
(4) B.P.=260–256° C./0.46 mm.; $n_D^{25}$=1.5077; 2.9 percent of the overhead.
(5) Bottoms=26.4 percent of the overhead.

Fraction 2 contained 2.45 moles of phenoxy-groups and 3.55 moles of $C_3$-fluoroalkoxy groups and had the following physical properties: K.Vis.$_{100}$=153.3 cs.; K.Vis.$_{210}$=9.90 cs.; ASTM slope=0.837; pour point =+10° F.; density=1.51; spontaneous ignition temperature=1175° F. Fraction 3 contained 3.60 moles of phenoxy groups and 2.40 moles of $C_3$-fluoroalkoxy groups and had the following properties: K.Vis.$_{100}$=165.0 cs.; K.Vis.$_{210}$=10.60 cs.; ASTM slope=0.812; pour point =+20° F.; density=1.43; spontaneous ignition temperature=1225° F.

Example 4

The experiment described in Example 3 was repeated, except that 1.688 moles (233 g.) of the $C_3$-fluoro alcohol, 0.563 mole (52 g.) of phenol, 2.25 moles (140.3 g.) of potassium hydroxide, and 0.3 mole (104.1 g.) of trimeric phosphonitrilic chloride were employed. A reaction product was obtained at a B.P.=188–209° C./0.41 mm. It contained 1 mole of phenoxy-groups and 5 moles of $C_3$-fluoroalkoxy-groups. Physical properties of this cut were as follows: K.Vis.$_{100}$=121 cs.; K.Vis.$_{210}$=9.13 cs.; ASTM slope=0.82; $n_D^{25}$=1.4049; pour point=−10° F.; density=1.51; spontaneous ignition temperature =1075° F.

*Example 5*

The residue obtained in Example 4, after separating the 188–209° C. fraction, was distilled to yield a product at a B.P.=209–214° C./0.41 mm. having a refractive index, $n_D^{25}$=1.4389. It contained 2 moles of phenoxy-groups and 4 moles of C$_3$-fluoroalkoxy-groups and the average composition corresponded approximately to Formula VI and/or isomers thereof.

*Example 6*

Amounts of 311 g. (0.938 mole) of H(CF$_2$)$_6$CH$_2$OH, 88 g. (0.938 mole) of phenol, 117 g. (1.876 moles) of potassium hydroxide, 86.9 g. (0.25 mole) of phosphonitrilic chloride trimer, and 1000 ml. of xylene were reacted as described in Example 1. Fractional distillation of the crude reaction product (339.2 g.) resulted in 277.2 g. of a liquid having a B.P.=231–264° C./2.4 mm.; and a refractive index, $n_D^{25}$=1.4101. It contained 2.89 moles of phenoxy-groups and 3.11 moles of C$_7$-fluoroalkoxy-groups. Physical properties were as follows: K.Vis.$_{100}$=157 cs.; K.Vis.$_{210}$=12.2 cs.; ASTM slope=0.74; pour point=0° F.; density=1.65; spontaneous ignition temperature=1150° F.

*Example 7*

Amounts of 324 g. (0.85 mole) of H(CF$_2$)$_8$CH$_2$OH, 70.5 g. (0.75 mole) of phenol, 93.5 g. (1.5 moles) of potassium hydroxide, 69.5 g. (0.2 mole) of phosphonitrilic chloride trimer, and 1000 ml. of xylene were reacted as described in Example 1. Fractionation of the crude reaction product (233 g.) resulted in 161.5 g. of a liquid having a B.P.=246–277° C./0.1 mm.; and a refractive index, $n_D^{25}$=1.3988. It contained 2.95 moles of phenoxy-groups and 3.05 moles of C$_9$-fluoroalkoxy-groups. Other physical properties were as follows: KVis.$_{100}$=252; K.Vis.$_{210}$=13.8; ASTM slope=0.81; pour point=+10° F.; density=1.68;

spontaneous ignition temperature=1125° F.

*Example 8*

Amounts of 218.5 g. (0.938 mole) of H(CF$_2$)$_4$CH$_2$OH, 88.1 g. (0.938 mole) of phenol, 86.9 g. (0.188 mole) of phosphonitrilic chloride tetramer, 116 g. (2.07 moles) of potassium hydroxide, and 1000 ml. of xylene were reacted as described in Example 1.

Vacuum distillation of the crude reaction product gave the following fractions:

(1) B.P.=77–257° C./1.0 mm.; $n_D^{25}$=1.4171; 6.4 percent of the total distillate.
(2) B.P.=257–260° C./1.1 mm.; $n_D^{25}$=1.4028; 18.8 percent of the total distillate.
(3) B.P.=260–276° C./1.4 mm.; $n_D^{25}$=1.4188; 71.9 percent of the total distillate.
(4) B.P.=276–279° C./2.3 mm.; $n_D^{25}$=1.4413; 3.1 percent of the total distillate.
(5) Bottoms=35.7 percent of the total overhead distillate.

Combined fractions 2 and 3 had a refractive index of 1.4145, and contained 3.03 moles of phenoxy-groups and 4.97 moles of C$_5$-fluoroalkoxy-groups. Physical properties were as follows: K.Vis.$_{100}$=187.5 cs.;

K.Vis.$_{210}$=15.75 cs.

ASTM slope=0.684; pour point=−20° F.;

density=1.60 spontaneous ignition temperature=1160° F.

*Example 9*

Amounts of 198.3 g. (1.5 moles) of H(CF$_2$)$_2$CH$_2$OH, 168 g. (1.5 moles) of p-fluorophenol, 187 g. (3.0 moles) of potassium hydroxide, 139 g. (0.4 mole) of phosphonitrilic chloride trimer, and 1000 ml. of toluene were reacted as described in Example 1. The yield of crude product amounted to 278.0 g. Fractionation of the crude product resulted in 77.8 g. of a liquid boiling at 190–213° C./0.08 mm.; and 86.6 g. of a liquid boiling at 213–245° C./0.09 mm.

The first fraction ($n_D^{25}$=1.4287) contained 2.0 moles of p-fluorophenoxy-groups and 4.0 moles of C$_3$-fluoroalkoxy-groups. Other physical properties were as follows: K.Vis.$_{100}$=166 cs.; K.Vis.$_{210}$=10.8 cs.; ASTM slope=0.82; pour point=+5° F.; density=1.58; spontaneous ignition temperature=1140° F.

The second fraction ($n_D^{25}$=1.4670) contained 3.14 moles of p-fluorophenoxy-groups and 2.86 moles of C$_3$-fluoroalkoxy-groups. Other physical properties were as follows: K.Vis.$_{100}$=223 cs.; K.Vis.$_{210}$=12.1 cs.; ASTM slope=0.83; pour point=+20° F.; density=1.51; spontaneous ignition temperature=1175° F.

*Example 10*

Amounts of 218.5 g. (0.938 mole) of H(CF$_2$)$_4$CH$_2$OH, 185 g. (0.938 mole) of 2,4,5-trichlorophenol, 86.9 g. (0.25 mole) of phosphonitrilic chloride trimer, 116 g. (1.87 moles) of potassium hydroxide, and 1000 ml. of xylene were reacted as described in Example 1.

The crude yield amounted to 89.0 percent of the theory. Distillation gave the following fractions:

(1) B.P.=100–203° C./.45 mm.; $n_D^{25}$=1.4000; 17.5 percent of the total distillate.
(2) B.P.=203–264° C./0.50–0.75 mm.; $n_D^{25}$=1.4335; 41.2 percent of the total distillate.
(3) B.P.=251–264° C./0.55–0.75 mm.; $n_D^{25}$=1.4848; 39.5 percent of the total distillate.
(4) B.P.=233–251° C./0.55 mm.; $n_D^{25}$=1.5123; 2.0 percent of the total distillate.
(5) Bottoms=36.0 percent of the total distillate.

Evolution of hydrogen chloride was observed during distillation. The combined fractions 2 and 3 had a refractive index of 1.4589, and contained 2.76 moles of trichlorophenoxy-groups and 3.24 moles of C$_5$-fluoroalkoxy-groups, and had the following physical properties:

K.Vis.$_{100}$=259.0 cs.

K.Vis.$_{210}$=11.9 cs.; ASTM slope=0.871;

pour point=+15° F.

density=1.67;

spontaneous ignition temperature=1175° F.

*Example 11*

Amounts of 218.5 g. (0.938 mole) of H(CF$_2$)$_4$CH$_2$OH, 101.2 g. (0.938 mole) of m-cresol, 116 g. (1.87 moles) of potassium hydroxide, 86.9 g. (0.25 mole) of phosphonitrilic chloride trimer, and 1000 ml. of xylene were reacted as described in Example 1.

The crude yield of the reaction product amounted to 98.0 percent of the theory. Distillation gave the following fractions:

(1) B.P.=108–230° C./0.1 mm.; $n_D^{25}$=1.4023; 7.0 percent of the total overhead.
(2) B.P.=230–254° C./0.12 mm.; $n_D^{25}$=1.4126; 49.7 percent of the total overhead.
(3) B.P.=254–272° C./0.16 mm.; $n_D^{25}$=1.4559; 38.2 percent of the total overhead.
(4) B.P.=246–269° C./0.25 mm.; $n_D^{25}$=1.4611; 5.2 percent of the total overhead.
(5) Bottoms=18.9 percent of the overhead distillate.

Combined fractions 2 and 3 had a refractive index of 1.4319, and contained 2.66 moles of m-methylphenoxy-groups and 3.34 moles of C$_5$-fluoroalkoxy-groups. Physical properties were as follows: K.Vis.$_{100}$=173.1 cs.;

K.Vis.$_{210}$=11.4 cs.

ASTM slope=0.803; pour point=0° F.; density=1.52; spontaneous ignition temperature=1200° F.

Example 12

Amounts of 232 g. (1.0 mole) of $H(CF_2)_4CH_2OH$, 108.3 g. (1.0 mole) of m-cresol, 124.5 g. (2.0 moles) of potassium hydroxide, 92.7 g. (0.2 mole) of phosphonitrilic chloride tetramer, and 1000 ml. of xylene were reacted as described in Example 1.

The crude yield amounted to 276.0 g. of a liquid. Fractionation of the crude product gave 49.9 g. boiling at 227–243° C./0.08 mm., 102.1 g. boiling at 243–255° C./0.06 mm. and 42.4 g. boiling at 255–287° C./0.06–0.02 mm. The first fraction had a refractive index of 1.4096, and contained 2.0 moles of m-methyl phenoxy-groups and 6.0 moles of $C_3$-fluoroalkoxy-groups. Physical properties were as follows: $K.Vis._{100}=169$ cs.; $K.Vis._{210}=14.2$ cs.; ASTM slope=0.70; pour point=−20° F.; density=1.59; spontaneous ignition temperature=1150° F.

The second fraction had a refractive index of 1.4320, and contained 3.0 moles of m-methylphenoxy-groups and 5.0 moles of $C_3$-fluoroalkoxy-groups. Physical properties were as follows: $K.Vis._{100}=195$ cs.; $K.Vis._{210}=15.7$ cs.; ASTM slope=0.70; pour point=−15° F.; density=1.53; spontaneous ignition temperature=1140° F.

The third fraction had a refractive index of 1.4629, and contained 4.98 moles of m-methylphenoxy-groups and 3.02 moles of $C_3$-fluoroalkoxy-groups. Physical properties were as follows: $K.Vis._{100}=248$ cs.; $K.Vis._{210}=17.5$ cs.; ASTM slope=0.70; pour point=0° F.; density=1.48; spontaneous ignition temperature=1150° F.

Example 13

Amounts of 218.5 g. (0.938 mole) of $H(CF_2)_4CH_2OH$, 152 g. (0.938 mole) of m-trifluoromethyl phenol, 117 g. (1.87 moles) of potassium hydroxide, 86.9 g. (0.25 mole) of phosphonitrilic chloride trimer, and 1000 ml. of xylene were reacted as described in Example 1.

The crude yield was 98.8 percent of the theory. Distillation afforded the following fractions:

(1) B.P.=98–228° C./0.4 mm.; $n_D^{25}=1.3968$; 10.1 percent of the total overhead.

(2) B.P.=228–242° C./0.4 mm.; $n_D^{25}=1.4001$; 42.4 percent of the total overhead.

(3) B.P.=242–244° C./0.3 mm.; $n_D^{25}=1.4221$; 43.7 percent of the total overhead.

(4) B.P.=238–244° C./0.7 mm.; $n_D^{25}=1.4379$; 3.8 percent of the total overhead.

(5) Bottoms=14.6 percent of the overhead.

Combined fractions 2 and 3 had a refractive index of 1.4112, and contained 2.84 moles of the aryloxy and 3.16 moles of the $C_5$-fluoroalkoxy groups. Physical properties were as follows: $K.Vis._{100}=151$ cs.; $K.Vis._{210}=11.1$ cs.; ASTM slope =0.77; pour point=+5° F.; density=1.66; spontaneous ignition temperature=1175° F.

Example 14

Amounts of 93.1 g. (0.75 mole) of m-methoxyphenol, 174 g. (0.75 mole) of $H(CF_2)_5CH_2OH$, 69.5 g. (0.2 mole) of phosphonitrilic chloride trimer, 93.4 g. (1.67 moles) of potassium hydroxide, and 800 ml. of xylene were reacted as described in Example 1, affording 211.5 g. of crude reaction product.

Upon distillation the following fractions were obtained:

(1) B.P.=108–237° C./0.1 mm.; $n_D^{25}=1.3971$; 7.7 percent of the total overhead.

(2) B.P.=237–282° C./2.5 mm.; $n_D^{25}=1.4223$; 63.0 percent of the total overhead.

(3) B.P.=282–295° C./4.0 mm.; $n_D^{25}=1.4545$; 25.0 percent of the total overhead.

(4) B.P.=289–293° C./1.5 mm.; $n_D^{25}=1.4480$; 4.1 percent of the total overhead.

Fractions 2 and 3 were combined and had a refractive index of 1.4318, and contained 2.43 moles of m-methoxy-phenoxy-groups and 3.57 moles of $C_5$-fluoroalkoxy-groups. Physical properties were as follows: $K.Vis._{100}=230.1$ cs.; $K.Vis._{210}=14.1$ cs.; ASTM slope=0.747; pour point=+10° F.; density=1.58; spontaneous ignition temperature=1050° F.

Example 15

A mixture of m-phenoxy phenol (0.417 mole, 77.6 g.), phosphonitrilic chloride trimer (0.167 mole, 58.0 g.), potassium hydroxide (27.6 g.), and xylene (500 ml.), and a mixture of $H(CF_2)_4CH_2OH$ (0.833 mole, 193.0 g.), potassium hydroxide (54.9 g.), and xylene (250 ml.), were reacted by the two-step technique described in Example 2.

The yield of crude reaction product amounted to 93.5 percent of the theory. Distillation gave the following fractions:

(1) B.P.=110–257° C./0.4 mm.; $n_D^{25}=1.4277$; 12.9 percent of the total overhead.

(2) B.P.=257–294° C./0.4 mm.; $n_D^{25}=1.4365$; 18.7 percent of the total overhead.

(3) B.P.=293–297° C./0.5 mm.; $n_D^{25}=1.4520$; 56.9 percent of the total overhead.

(4) B.P.=294–297° C./0.5 mm.; $n_D^{25}=1.4608$; 5.0 percent of the total overhead.

(5) B.P.=144–292° C./0.5 mm. (restarted); $n_D^{25}=1.4928$; 2.7 percent of the total overhead.

(6) B.P.=297° C./0.5 mm.; $n_D^{25}=1.4739$; 3.8 percent of the total overhead.

(7) Bottoms=51.0 percent of the total overhead.

The combined fractions 2, 3 and 4 had a refractive index of 1.4454; nuclear magnetic resonance indicated the presence of 1.39 m-phenoxy phenoxy groups, the remainder being the $C_5$-fluoroalkoxy group. Physical properties: $K.Vis._{100}=366$ cs.; $K.Vis._{210}=19.3$ cs.; ASTM slope=0.64; density=1.57; pour point=−5° F.; spontaneous ignition temperature=1200° F.

Example 16

A mixture of m-phenoxy phenol (0.21 mole, 39.1 g.), phosphonitrilic chloride trimer (0.167 mole, 58.0 g.), potassium hydroxide (13.8 g.), and xylene (500 ml.), and a mixture of $H(CF_2)_4CH_2OH$ (1.05 moles, 244.0 g.), potassium hydroxide (69.2 g.), and xylene (250 ml.) were reacted according to the procedure of Example 2. Upon distillation the following fractions were obtained:

(1) B.P.=108–215° C./0.3 mm.; $n_D^{25}=1.3655$; 11.5 percent of the total overhead.

(2) B.P.=216–251° C./0.3 mm.; $n_D^{25}=1.3972$; 68.7 percent of the total overhead.

(3) B.P.=251–286° C./1.7 mm.; $n_D^{25}=1.4214$; 20.7 percent of the total overhead.

(4) Bottoms=48.8 percent of the total overhead.

The principal product, fraction 2, contained 0.87 mole of aryloxy group and 5.13 moles of $C_6$-fluoroalkoxy groups. Other properties were as follows: $K.Vis._{100}=174$ cs.; $K.Vis._{210}=13.5$ cs.; ASTM slope=0.70; pour point=−10° F. density=1.66.

Example 17

A 5-liter, 3-neck flask was charged with 84.5 g. of sodium hydride (1.875 moles, 53.3 percent suspension in mineral oil) and washed with seven 150 ml. portions of dry ether. The flask was then equipped with an efficient condenser, drying tube, stirrer, and dropping funnel. A solution of trifluoroethanol, $CF_3CH_2OH$ (1.875 moles, 187.5 g.) in dry ether (187 ml.) added to the sodium hydride at such a rate, that gentle refluxing was maintained. More ether was added when the suspension became difficult to stir. Toluene (1250 ml.) was added and the ether removed by distillation until a flask temperature of 100° C. was reached. After cooling a Dean-Stark distilling trap was attached to the reaction apparatus and phosphonitrilic chloride trimer (173.8 g., 0.5 mole), phenol (176.5 g., 1.875 moles), and potassium hydroxide (116.8 g., 1.875 moles, calculated as 90 percent) were added.

After the very vigorous initial reaction (which was moderated by a wet ice bath) had ceased, the mixture was heated to reflux for 16 hours after no more water was collected and 50 ml. of water were separated. The cooled reaction mixture was extracted with 5 percent aqueous potassium hydroxide and then with water. The separation of the reaction product was performed as described in Example 1. The yield of crude reaction product amounted to 330.4 g. (93 percent of the theory).

Distillation in vacuo gave the following products.

(1) B.P.=121–140° C./0.02–0.03 mm.; 11.8 percent of the overall yield; $n_D^{25}$=1.3950; K.Vis.$_{100}$=13.3 cs.; K.Vis.$_{210}$=2.37 cs.; ASTM slope=0.97; pour point=–25° F.; density=1.54; and spontaneous ignition $$\text{temperature}=1175° \text{ F.}$$

This composition contained 0.87 mole of phenoxy groups and 5.13 moles of trifluoroethoxy groups.

*Analysis.*—Found: Percent N=5.75%, 5.81%. Calculated: Percent N=5.81%.

(2) B.P.=140–173° C./0.02 mm.; 48.0 percent of the overall yield; $n_D^{25}$=1.4321; K.Vis.$_{100}$=23.4 cs.;

$$\text{K.Vis.}_{210}=4.00$$

cs.; ASTM slope=0.91; pour point=–10° F.;

$$\text{density}=1.46$$

and spontaneous ignition temperature =1175° F. This product contained 1.68 moles of phenoxy groups.

*Analysis.*—Found: Percent N=6.02%, 5.77%. Calculated: Percent N=5.85%.

(3) B.P.=173–198° C./0.02 mm.; 17.8 percent of the overall yield; $n_D^{25}$=1.4825; K.Vis.$_{100}$=49.8 cs.;

$$\text{K.Vis.}_{210}=5.45$$

cs.; ASTM slope=0.86; pour point=+5° F;

$$\text{density}=1.41$$

spontaneous ignition temperature=1225° F. This product contained 3.22 moles of phenoxy groups.

*Analysis.*—Found: Percent N=5.86%, 5.99%. Calculated: Percent N=5.92%.

Example 18

The reaction described in Example 17 was repeated using (PNCl$_2$)$_4$ (173.8 g., 0.375 mole) instead of (PNCl$_2$)$_3$ and employing xylene as solvent in place of toluene. The yield of crude reaction product amounted to 71.8 percent of the theory.

Vacuum distillation gave the following products:

(1) B.P.=160–185° C./0.02 mm.; 18.3 percent of the overall yield; $n_D^{25}$=1.4408; K.Vis.$_{100}$=40.6 cs.;

$$\text{K.Vis.}_{210}=5.8$$

cs.; ASTM slope=0.76; pour point=–10°F;

$$\text{density}=1.48$$

This fraction contained 2.53 moles of phenoxy groups and 5.47 moles of trifluoroethoxy groups.

(2) B.P.=185–232° C./0.02 mm.; 29.4 percent of the overall yield; $n_D^{25}$=1.4808; K.Vis.$_{100}$=71.2 cs.;

$$\text{K.Vis.}_{210}=8.3$$

cs.; ASTM slope=0.73; pour point=+5° F.;

$$\text{density}=1.42$$

The product contained 4.12 moles of phenoxy groups.

(3) B.P.=232–267° C./0.02–0.1 mm.; 13.5 percent of the overall yield; $n_D^{25}$=1.5189; K.Vis.$_{100}$=139.4 cs.;

$$\text{K.Vis.}_{210}=12.7$$

cs.; ASTM slope=0.71; pour point=+15° F.;

$$\text{density}=1.37$$

spontaneous ignition temperature=1175° F.

Example 19

Amounts of 84.5 g. (1.875 moles; 53.3 percent suspension in mineral oil) of sodium hydride, 187.5 g. (1.875 moles of trifluoroethanol in 185 ml. of dry ether, 173.8 g. (0.5 mole) of (PNCl$_2$)$_3$, 202.5 g. (1.875 moles) of m-cresol, 116.8 g. (1.875 moles) of potassium hydroxide and 1250 ml. of xylene were reacted as described in Example 17. The yield of crude reaction product amounted to 92.3 percent of the theory. Distillation gave the following fractions:

(1) B.P.=156–186° C./0.2 mm.; 17.4 percent of overall yield; $n_D^{25}$=1.4340; K.Vis.$_{100}$=30.4 cs.;

$$\text{K.Vis.}_{210}=3.61$$

cs.; ASTM slope=0.96; pour point=–5° F.;

$$\text{density}=1.45$$

spontaneous ignition temperature=1175° F.; aryloxy content=1.94 moles.

(2) B.P.=186–207° C./0.2 mm.; 20.6 percent of overall yield; $n_D^{25}$=1.4523; K.Vis.$_{100}$=43.0 cs.;

$$\text{K.Vis.}_{210}=4.42 \text{ cs.}$$

ASTM slope=0.93; pour point=0° F.; density=1.42; spontaneous ignition temperature=1225° F.; aryloxy contents=2.38 moles.

(3) B.P.=207–247° C./0.2–0.3 mm.; 30.3 percent of overall yield; $n_D^{25}$=1.4956; K.Vis.$_{100}$=110.0 cs.;

$$\text{K.Vis.}_{210}=7.50 \text{ cs.}$$

ASTM slope=0.89; pour point=+20° F.; density=1.36; spontaneous ignition temperature=1225° F.; aryloxy contents=3.46 moles.

Example 20

Reaction described in Example 18 was repeated but 202.5 g. (1.875 moles) of m-cresol were employed. The crude yield amounted to 87.3 percent of the theory. Distillation afforded the following products:

(1) B.P.=166–217° C./0.03 mm.; 25.1 percent of overall yield; $n_D^{25}$=1.4432; K.Vis.$_{100}$=45.3 cs.;

$$\text{K.Vis.}_{210}=5.80 \text{ cs.}$$

ASTM slope=0.80; pour point=–10° F.; density=1.44; spontaneous ignition temperature=1175° F.

(2) B.P.=217–261° C./0.04–0.06 mm.; 37.9 percent of overall yield; $n_D^{25}$=1.4807; K.Vis.$_{100}$=84.1 cs.;

$$\text{K.Vis.}_{210}=8.70 \text{ cs.}$$

ASTM slope=0.76; pour point=+5° F.; density=1.36; spontaneous ignition temperature=1200° F.

(3) B.P.=261–278° C./0.06–0.7 mm.; 12.6 percent of overall yield; $n_D^{25}$=1.5114; K.Vis.$_{100}$=172.1 cs.;

$$\text{K.Vis.}_{210}=13.0 \text{ cs.}$$

ASTM slope=0.75; pour point=+15° F.; density =1.32; spontaneous ignition temperature=1200° F.; aryloxy content=4.68 moles.

Fractions 1 and 2 combined had the following properties: $n_D^{25}$=1.4661; K.Vis.$_{100}$=65.9 cs.; K.Vis.$_{210}$=7.50 cs.; ASTM slope=0.76; pour point=0° F.; density=1.40; spontaneous ignition temperature=1150° F.; aryloxy content=3.34 moles.

Example 21

Amounts of 50.7 g. (1.125 moles; 53.3 percent) of sodium hydride, 112.5 g. (1.125 moles) of trifluoroethanol, 70.2 g. (1.125 moles; 90 percent) of potassium hydroxide, 182.3 g. (1.125 moles) of m-trifluoromethyl phenol, and 104.1 g. (0.3 mole) of (PNCl$_2$)$_3$ were reacted as described in Example 17. After distillation in vacuo, the principal reaction product amounted to a 43.7 percent yield and had the following properties: density=1.53; K.Vis.$_{100}$=65.4 cs.; K.Vis.$_{210}$=6.00 cs.; ASTM slope=0.88; pour point=+5° F.; spontaneous ignition temperature=1200° F.; B.P.=180–210° C./0.03–0.05 mm.; $n_D^{25}$=1.4470; aryloxy content=3.47 moles.

*Analysis.*—Found: percent N=4.57%, 4.54%. Calculated: percent N=4.45%.

Example 22

To a suspension of sodium trifluoroethoxide, prepared from 67.6 g. (1.5 moles) of NaH and 150 g. (1.5 moles) of trifluoroethanol, in 1000 ml. of xylene were added 93.4 g. (1.5 moles) of potassium hydroxide at once, and 168 g. (1.5 moles) of m-fluorophenol at a slow rate. When the initial reaction was completed, a solution of 139.0 g. (0.4 mole) of (PNCl$_2$)$_3$ in 400 ml. of xylene was added dropwise at about 70° C. Then the mixture was refluxed until no more water was collected in a Dean-Stark distilling trap, and was worked up as described in Example 1. Vacuum distillation afforded the following products:

(1) B.P.=170–203° C./0.03–0.04 mm.; $n_D^{25}$=1.4468; 39.2 percent of the overall yield; density=1.52;

K.Vis.$_{100}$=29.7 cs.

K.Vis.$_{210}$=4.08 cs.; ASTM slope=0.87; pour point= −15° F.; spontaneous ignition temperature=1225° F.; aryloxy content=2.49 moles.

*Analysis.*—Found: percent N=5.46%, 5.37%. Calculated: percent N=5.45%.

(2) B.P.=203–241° C./0.03–0.07 mm.; $n_D^{25}$=1.4931; 26.1 percent of overall yield; density=1.46;

K.Vis.$_{100}$=57.4 cs.

K.Vis.$_{210}$=6.15 cs.; ASTM slope=0.82; pour point=0° F.; spontaneous ignition temperature=1275° F.; aryloxy content=3.86 moles.

*Analysis.*—Found: percent N=5.19%, 5.22%. Calculated: percent N=5.42%.

Combined fractions 1 and 2: B.P=170–241° C./0.03–0.07 mm.; $n_D^{25}$=1.4622; 59.3 percent of overall yield; density=1.49; K.Vis.$_{100}$=36.8; K.Vis.$_{210}$=4.60; ASTM slope=0.86; pour point=−10° F.; spontaneous ignition temperature=1225° F.; aryloxy content=2.97 moles.

*Analysis.*—Found: percent N=5.51%, 5.55%. Calculated: percent N=5.49%.

Example 23

The reaction described in Example 22 was repeated but 193.0 g. (1.5 moles) of m-chlorophenol was employed instead of m-fluoro phenol. The yield of crude product amount to 85 percent of the theory. Vacuum distillation afforded:

(1) B.P.=180–221° C./0.02–0.03 mm.; $n_D^{25}$=1.4642; 27.2 percent of overall yield; density=1.52;

K.Vis.$_{100}$=35.6 cs.

K.Vis.$_{210}$=4.75 cs.; ASTM slope=0.84; pour point= −10° F.; spontaneous ignition temperature=1200° F.; aryloxy content=2.34 moles.

(2) B.P.=221–282° C./0.03–0.09 mm.; $n_D^{25}$=1.5202; 24.2 percent of overall yield; density=1.48;

K.Vis.$_{100}$=98.2 cs.

K.Vis.$_{210}$=8.20 cs.; ASTM slope=0.82; pour point=+15° F.; spontaneous ignition temperature=1300° F.; aryloxy content=3.46 moles.

Example 24

Amounts of 225 g. (0.56 mole) of pentadecafluoro octanol, 53.0 g. (0.56 mole) of phenol, 70.2 g. (1.125 moles) of potassium hydroxide, 52.1 g. (0.15 mole) of (PNCl$_2$)$_3$, and 1000 ml. of xylene were reacted as described in Example 1. The properties of the principal reaction product are as follows: B.P.=230–240° C./0.1–0.4 mm.; $n_D^{25}$=1.3820; yield=57.1 percent;

K.Vis.$_{100}$=166.9 cs.

K.Vis.$_{210}$=9.7 cs.; ASTM slope=0.86; pour point=+15° F.; density=1.70;

spontaneous ignition temperature=1025° F. phenoxy content=2.76 moles.

*Analysis.*—Found: Percent N=2.33%, 2.35%. Calculated: Percent N=2.49%.

Example 25

According to the process of Example 22 there were reacted 45.1 g. (1.0 mole) of NaH (53.3 percent), 200.1 g. (1.0 mole) of heptafluorobutanol, 63.2 g. (1.0 mole) of potassium hydroxide, 94.1 g. (1.0 mole) of phenol, 92.7 g. (0.267 mole) of (PNCl$_2$)$_3$ in 300 ml. of xylene, and 1000 ml. of xylene. Two principal reaction products were obtained possessing the following properties:

(1) B.P.=160–182° C./0.03 mm.; $n_D^{25}$=1.3902; 27.6 percent overall yield; K.Vis.$_{100}$=45.4 cs.; K.Vis.$_{210}$=4.80 cs.; ASTM slope=0.90; density=1.59; spontaneous ignition temperature=1125° F.; pour point=−10° F.; phenoxy content=2.00 moles.

*Analysis.*—Found: Percent N=3.70%, 3.80%. Calculated: Percent N=3.76%.

(2) B.P.=182–221° C./0.03–0.05 mm.; $n_D^{25}$=1.4433; 15.0 percent overall yield; K.Vis.$_{100}$=79.4 cs.;

K.Vis.$_{210}$=6.60 cs.

ASTM slope=0.88; density=1.49; pour point=+5° F.; spontaneous ignition temperature=1175° F.; phenoxy content=3.27 moles.

*Analysis.*—Found: Percent N=4.49%, 4.32%. Calculated: Percent N=4.28%.

Example 26

The reaction of Example 25 was repeated but 108.1 g. (1.0 mole) of m-cresol was used to replace the phenol of Example 25.

Product (1) B.P.=168–180° C./0.05–0.06 mm.;

$n_D^{25}$=1.3881

11.8 percent of overall yield; K.Vis.$_{100}$=51.1 cs.; K.Vis.$_{210}$=4.90 cs.; ASTM slope=0.93; density=1.53; spontaneous ignition temperature=1200° F.; pour point=not determined; aryloxy content=1.78 moles.

*Analysis.*—Found: Percent N=3.37%, 3.45%. Calculated: Percent N=3.60%.

Product (2) B.P.=180–230° C./0.06–0.09 mm.;

$n_D^{25}$=1.4292

42.4 percent of overall yield; K.Vis.$_{100}$=88.4 cs.; K.Vis.$_{210}$=6.75 cs.; ASTM slope=0.89; pour point=0° F.; density=1.48; spontaneous ignition temperature=1175° F.; aryloxy content=2.81 moles.

*Analysis.*—Found: Percent N=3.86%, 3.83%. Calculated: Percent N=3.92%.

Hydrolytic stability tests

The compounds of this invention are hydrolytically stable. In order to pass extreme requirements, the removal of traces of impurities is essential and is best done by the following procedure.

The compound is gently stirred and refluxed with an equal weight of 10 percent aqueous potassium hydroxide for 24 hours. The cooled product is washed with water until neutral and then dried over phosphorus pentoxide in a vacuum desiccator. This material is then stirred with 2 percent by weight of charcoal at 70° C. for one hour and filtered using filter aid. The charcoal treatment is repeated once more. Materials treated in this fashion pass the hydrolytic stability test according to Military Specification (Ships) MIL–H–19457A by a wide margin (Example 1).

The hydrolytic stability test is performed in a beverage bottle which contains a 75 g. sample of the fluid, 25 g. of deionized water and a specially prepared copper corrosion specimen and which is rotated in an oven at 93° C. The rotation is carried out "end over end" at 5 revolutions per minute. After 48 hours, the acidity of the water and fluid layer are measured, and weight and appearance changes of the copper specimen are noted.

For comparison, the most important specifications and some results for fluids purified according to the procedure given above, are listed in the following table:

| Compound [1] | Water Layer, mg. KOH Consumed | Test Fluid, Acid No. After Test | Copper Specimen | |
|---|---|---|---|---|
| | | | Weight Loss, mg./sq. cm. | Appearance |
| MIL-H-19457A | 5.0 max | 0.2 [2] | 0.3 max | No corrosion, brown stain permitted. |
| 1 | 0.28 | 0.02 | 0.083 | Maroon stain. |
| 7 | 0.29 | 0.06 | 0.22 | Moderate brown to maroon stain. |
| 3 | 0.70 | 0.06 | 0.26 | Moderate stain. |
| 5 | 0.87 | 0.06 | 0.26 | Light stain. |
| 17 | 0.56 | 0.01 | 0.016 | Brown stain. |
| 21 | 1.18 (alkaline). | 0.01 | 0.060 | Do. |
| 18 | 0.12 (alkaline). | none detected | 0.023 | Do. |

[1] Compound numbers are identical with example numbers.
[2] Maximum acid number increase.

Lubricity tests

The compounds prepared according to the procedures described in the foregoing examples were tested in the Falex lubricity test. In this procedure, a steel peg of 0.25 inch diameter, immersed in the test fluid, is rotated between two V-shaped bearing blocks, which are pressed against the peg by a loading device, connected to a ratchet wheel. The amount of wear is determined from the number of teeth (notches) the ratchet wheel must be advanced to maintain a desired load. The diameter decrease of the peg is also measured. A low number of notches take-up and a small diameter decrease indicate good lubricity of the fluid tested. Runs were performed with the compound prepared according to Example 1 using Ucon 50 HB 660 and tricresyl phosphate as reference fluids. In each case, the load was increased in eight hourly increments of 100 lbs. each, after which the total notches take-up and the diameter decrease was observed. The compound prepared according to Example 1 performed much better than the reference fluids with regard to both notches take-up and diameter decrease. The results are given in the following table.

| Compound [1] | Time, Hours | Max. Load, Pounds | Take-up Notches | Condition | Diameter Decrease, Inch |
|---|---|---|---|---|---|
| Ucon 50 HB 660 [2] | 6.0 | 700 | 129 | Severely worn | 0.0170 |
| Tricresyl phosphate | 8.0 | 800 | 142 | do | 0.0070 |
| 1 | 8.0 | 800 | 34 | Scarred | 0.0002 |

[1] The compound number corresponds to the example number.
[2] Trademark of Union Carbide Company for a 50/50 molar mixture of ethylene oxide and propylene oxide added to butanol until the kinematic viscosity is 660 at 100° F. The molecular weight is 1760.

The products of this invention do not sustain combustion as evidenced by tests in which lubricating fluids such as those prepared in the above examples were atomized in an atomizer and sprayed into a Bunsen burner flame. The spray burned in the flame, but droplets passing outside of the flame were immediately self-extinguished.

Various modifications of the invention, some of which have been referred to above, may be employed without departing from the spirit of the invention.

What is desired to be secured by Letters Patent is:

1. A cyclic polymeric phosphonitrilate composition of the formula:

$$N_nP_nR'_aR''_b$$

where $n$ is a whole number selected from the group consisting of 3 and 4, where $a+b=2n$, where $a$ has a value between 1 and $(2n-1)$, where $b$ has a value between 1 and $(2n-1)$, where $R'$ is a polyfluoroalkoxy of the formula:

$$Z(CF_2)_yCH_2O-$$

where $y$ is a whole number between 1 and 20, where $Z$ is selected from the group consisting of hydrogen and fluorine, and where $R''$ is a phenoxy selected from the group consisting of phenoxy, naphthoxy, phenoxyphenoxy, lower alkoxy-substituted phenoxy, lower alkyl-substituted phenoxy, phenol-substituted phenoxy, halogen-substituted phenoxy, halogenated lower alkyl-substituted phenoxy, halogenated lower alkoxy-substituted phenoxy and mixtures thereof, wherein the halogen substituents are selected from the group consisting of chlorine, fluorine, and bromine.

2. The composition of claim 1 where $n$ is 3, where $y$ is a whole number between 1 and 8, where Z is hydrogen and where $R''$ is phenoxy.

3. The composition of claim 1 where $n$ is 3, where $y$ is a whole number between 1 and 8, where Z is hydrogen and where $R''$ is phenoxyphenoxy.

4. The composition of claim 1 where $n$ is 3, where $y$ is a whole number between 1 and 8, where Z is hydrogen and where $R''$ is lower alkoxy-substituted phenoxy.

5. The composition of claim 1 where $n$ is 3, where $y$ is a whole number between 1 and 8, where Z is hydrogen and where $R''$ is lower alkyl-substituted phenoxy.

6. The composition of claim 1 where $n$ is 3, where $y$ is a whole number between 1 and 8, where Z is hydrogen and where $R''$ is halogen-substituted phenoxy.

7. The composition of claim 1 where $n$ is 3, where $y$ is a whole number between 1 and 8, where Z is hydrogen and where $R''$ is halogenated lower alkyl-substituted phenoxy.

8. The composition of claim 1 where $n$ is 4, where $y$ is a whole number between 1 and 8, where Z is hydrogen and where $R''$ is phenoxy.

9. The composition of claim 1 where $n$ is 4, where $y$ is a whole number between 1 and 8, where Z is hydrogen and where $R''$ is phenoxyphenoxy.

10. The composition of claim 1 where $n$ is 4, where $y$ is a whole number between 1 and 8, where Z is hydrogen and where $R''$ is lower alkoxy-substituted phenoxy.

11. The composition of claim 1 where $n$ is 4, where $y$ is a whole number between 1 and 8, where Z is hydrogen and where $R''$ is lower alkyl-substituted phenoxy.

12. The composition of claim 1 where $n$ is 4, where $y$ is a whole number between 1 and 8, where Z is hydrogen and where $R''$ is halogenated-substituted phenoxy.

13. The composition of claim 1 where $n$ is 4, where $y$ is a whole number between 1 and 8, where Z is hydrogen and where R" is halogenated lower alkyl-substituted phenoxy.

14. The composition of claim 1 where $n$ is 3, where $y$ is a whole number between 1 and 8, where Z is fluorine and where R" is phenoxy.

15. The composition of claim 1 where $n$ is 3, where $y$ is a whole number between 1 and 8, where Z is fluorine and where R" is phenoxyphenoxy.

16. The composition of claim 1 where $n$ is 3, where $y$ is a whole number between 1 and 8, where Z is fluorine and where R" is lower alkoxy-substituted phenoxy.

17. The composition of claim 1 where $n$ is 3, where $y$ is a whole number between 1 and 8, where Z is fluorine and where R" is lower alkyl-substituted phenoxy.

18. The composition of claim 1 where $n$ is 3, where $y$ is a whole number between 1 and 8, where Z is fluorine and where R" is halogen-substituted phenoxy.

19. The composition of claim 1 where $n$ is 3, where $y$ is a whole number between 1 and 8, where Z is fluorine and where R" is halogenated lower alkyl-substituted phenoxy.

20. The composition of claim 1 where $n$ is 4, where $y$ is a whole number between 1 and 8, where Z is fluorine and where R" is phenoxy.

21. The composition of claim 1 where $n$ is 4, where $y$ is a whole number between 1 and 8, where Z is fluorine and where R" is phenoxyphenoxy.

22. The composition of claim 1 where $n$ is 4, where $y$ is a whole number between 1 and 8, where Z is fluorine and where R" is lower alkoxy-substituted phenoxy.

23. The composition of claim 1 where $n$ is 4, where $y$ is a whole number between 1 and 8, where Z is fluorine and where R" is lower alkyl-substituted phenoxy.

24. The composition of claim 1 where $n$ is 4, where $y$ is a whole number between 1 and 8, where Z is fluorine and where R" is halogen-substituted phenoxy.

25. The composition of claim 1 where $n$ is 4, where $y$ is a whole number between 1 and 8, where Z is fluorine and where R" is halogenated lower alkyl-substituted phenoxy.

References Cited by the Examiner

UNITED STATES PATENTS 2,192,921   3/1940   Lipkin _____ 260—461

OTHER REFERENCES

Mao et al.: Journal of Inorganic and Nuclear Chemistry, vol. 24, January 1962, p. 53–58.

Ratz et al.: "J. Am. Chem. Soc.," vol. 84 (February 1962), pp. 551–555.

WALTER A. MODANCE, *Primary Examiner.*

HARRY I. MOATZ, *Assistant Examiner.*